United States Patent
Kennedy (10) Patent No.: US 7,508,821 B2
(45) Date of Patent: Mar. 24, 2009

(54) METHOD FOR SETTING UP A DATA CONNECTION BETWEEN TERMINAL DEVICES

(75) Inventor: Stephan Kennedy, Windach (DE)

(73) Assignee: Siemens Aktiengesellschaft, Munich (DE)

( * ) Notice: Subject to any disclaimer, the term of this patent is extended or adjusted under 35 U.S.C. 154(b) by 301 days.

(21) Appl. No.: 11/387,998

(22) Filed: Mar. 23, 2006

(65) Prior Publication Data

US 2006/0215640 A1 Sep. 28, 2006

(30) Foreign Application Priority Data

Mar. 23, 2005 (DE) .................. 10 2005 013 544

(51) Int. Cl.
*H04L 12/54* (2006.01)
(52) U.S. Cl. .................. 370/352; 370/338; 370/390; 370/432
(58) Field of Classification Search .......... 370/352, 370/395.2, 401, 260, 356, 346, 395.21; 709/206, 709/227, 237, 220
See application file for complete search history.

(56) References Cited

U.S. PATENT DOCUMENTS

| | | | |
|---|---|---|---|
| 6,707,813 B1 * | 3/2004 | Hasan et al. ................ | 370/356 |
| 7,298,747 B2 * | 11/2007 | Mercuriali ............. | 370/395.21 |
| 2001/0005372 A1 * | 6/2001 | Cave et al. .................. | 370/401 |
| 2002/0061014 A1 * | 5/2002 | Saller ........................ | 370/352 |
| 2003/0219006 A1 | 11/2003 | Har | |
| 2006/0013194 A1 * | 1/2006 | Baumann et al. ............ | 370/352 |
| 2006/0227728 A1 * | 10/2006 | Baumann .................... | 370/260 |
| 2007/0005804 A1 * | 1/2007 | Rideout ...................... | 709/246 |
| 2007/0041357 A1 * | 2/2007 | Hoffmann et al. .......... | 370/352 |
| 2007/0160031 A1 * | 7/2007 | Sylvain ....................... | 370/352 |

FOREIGN PATENT DOCUMENTS

| | | |
|---|---|---|
| EP | 1 205 082 B1 | 5/2002 |
| GB | 2 350 261 A | 11/2000 |
| WO | WO 01/08434 A1 | 2/2001 |
| WO | WO 03/096648 A1 | 11/2003 |

OTHER PUBLICATIONS

"An H.323 Gatekeeper Prototype: Design, Implementation, and Performance Analysis" Cheng-Yue Chang, Ming-Syan Chen and Pai-Han Huang IEEE Transactions on Multimedia, vol. 6, No. 6, Dec. 2004, pp. 936-946.*

* cited by examiner

*Primary Examiner*—Hassan Kizou
*Assistant Examiner*—Lonnie Sweet (57) ABSTRACT

A method for setting up a useful data connection between a first terminal device connected to a first connection controller and a second terminal device connected to a second connection controller is provided. In this case connection setup signaling is initiated by the first terminal device via possibly intermediate connection controllers to the second connection controller, in the course of which first useful data parameters specific to the first terminal device are transmitted to one of the connection controllers. As a result of the connection setup signaling, a connection setup message is transmitted without the first useful data parameters from the second connection controller to the second terminal device. Upon connection acceptance, a connection acceptance message is transmitted by the second terminal device from the second terminal device to one of the connection controllers, and subsequent thereto the first useful data parameters are transmitted to the second terminal device. Furthermore, following the arrival of the first useful data parameters at the second terminal device the useful data connection is set up from the second terminal device to the first terminal device.

8 Claims, 9 Drawing Sheets

METHOD FOR SETTING UP A DATA CONNECTION BETWEEN TERMINAL DEVICES

CROSS REFERENCE TO RELATED APPLICATIONS

This application claims priority of German application No. 102005013544.7 DE filed Mar. 23, 2005, which is incorporated by reference herein in its entirety.

FIELD OF INVENTION

The present invention relates to a method for setting up a useful data connection between terminal devices.

BACKGROUND OF INVENTION

In contemporary communication systems it is known to transmit useful data, e.g. for voice, video or multimedia communication, via packet-oriented networks. The use of packet-oriented data transmission methods often results in losses in the quality of the useful data to be transmitted, said losses frequently being due to conversions and delays of useful data packets by network nodes.

In conformity with the widely used "Internet Protocol", also referred to in its abbreviated form as IP, the term "IP terminal device" will also be used in the following to refer to communication terminals which operate on the basis of a packet-oriented transmission technology. In the packet-oriented transmission of useful data the term "Voice over IP", VoIP for short, is also common currency. In this case the ITU-T (International Telecommunication Union—Telecommunications Standardization Sector) recommendation H.323 or, as the case may be, the SIP (Session Initiation Protocol) protocol developed by the IETF (Internet Engineering Task Force) working group is widely established for VoIP communication.

Devices known as gateways are used for converting between circuit-oriented and packet-oriented transmission technologies, said gateways often being disposed in each case between a packet-oriented network and a communication equipment operating according to a circuit-switching method. In this case the gateways include means for mutual conversion of data streams into data packets. At the same time this conversion relates to both signaling data and useful data, which is to say in particular voice, video data or also nonverbal useful data such as, for example, audio signals of telecopier units or modems. The useful data is also referred to in technical circles as "payload".

As part of a more general description the term "connection controller" will also be used in the following for gateways, known as gatekeepers, as well as for devices which are involved as independent units in a call setup or in call switching in addition to the aforementioned units. Said connection controllers enable signaling information and payload to be exchanged between IP terminal devices during a call setup or when a connection has been established. In this case both this signaling information and the payload are frequently routed via the connection controllers.

A communication system is often characterized by being structured into individual subnetworks, with each subnetwork typically being managed by a communication equipment. In order to transmit useful data or signaling data, the communication equipments often operate according to different transmission methods or transmission protocols, depending on the necessary packet-oriented or circuit-oriented connection equipment type of the connected communication terminals.

SUMMARY OF INVENTION

In this case each of the communication equipments in the subnetworks can include a connection controller which manages its assigned IP terminal devices. A connection setup and the payload between two IP terminal devices can in this case be routed via a plurality of connection controllers if the communication connection to be set up extends over a plurality of subnetworks. This can lead to a slowing down of the connection setup, e.g. due to buffering in the connection controllers. Moreover, a repeated conversion into the transmission methods or protocols supported by the respective subnetworks is necessary in many cases. This can lead to a deterioration in the connection quality due to repeated decoding and encoding, data compression in the partial connections and delays in the connection controllers.

In a typical connection setup between two IP terminal devices via a connection controller of a communication equipment, for the two partial connections from the first IP terminal device to the connection controller and from the connection controller to the second IP terminal device, in particular coding methods and payload transport addresses of the communication partners for the respective partial connections are exchanged and negotiated via signaling messages and acknowledgement messages. When the call is accepted by the called IP terminal device, the payload is transmitted via the first and the second partial connections to the respective payload transport addresses of the communication partners using the negotiated coding methods of the respective partial connections, the payload being buffered in the connection controller as well as decoded and encoded using the coding method of the partial connections.

In order to improve at least some of the cited disadvantages, IP terminal devices that support ITU-T Recommendation H.323 and Direct Media Connection (DMC) can bypass the connection controllers and transmit communication payloads directly between the IP terminal devices, thereby avoiding additional conversions and delays. In this case an additional signaling and payload connection is usually set up—at the instigation of a connection controller—directly between the IP terminal devices, with the result that the IP terminal devices have connections to the respective other IP terminal device and to the connection controller. It is disadvantageous here, however, that the IP terminal devices must support the DMC protocol, that signaling and payload connections are set up between all three communication partners involved and consequently an increased resource requirement results. It is also disadvantageous that DMC does not support a direct media connection for SIP terminal devices.

Patent publications WO 03/096648 A1, WO 01/08434 A1, GB 2350261 A and EP 1205082 B1 disclose various connection setup methods for different types of networks with the inclusion of further network nodes between these network nodes and/or terminal devices. Furthermore, U.S. patent publication US 2003/0219006 A1 discloses a method wherein delays in a communication via H.323 gateways are reduced and video and audio quality improved.

An object of the present invention is to provide a more flexible method for setting up a useful data connection between terminal devices.

This object is achieved by a method having the features recited in the independent claim. Advantageous embodiments of the invention are set forth in the dependent claims.

With the method according to the invention, in order to set up a useful data connection between a first terminal device connected to a first connection controller—preferably on a packet-oriented basis—and a second terminal device connected to a second connection controller—preferably on a packet-oriented basis—connection setup signaling is initiated by the first terminal device to the second connection controller. In this case the terminal device can be, for example, an IP terminal device such as an IP telephone, a multimedia application or an IP softclient of a PC. The connection controller can be, for example, a gateway providing a transition to a circuit-oriented network or a gatekeeper which provides service features for the terminal device. In the course of the connection setup signaling, first useful data parameters specific to the first terminal device are transmitted to one of the connection controllers. In this case useful data parameters can be, for example, terminal device-specific parameters for the useful data connection that is to be set up, in particular address information—e.g. an IP address—via which the terminal device is addressed for the useful data connection. Furthermore, the coding methods supported by the terminal device, for example, can be identified by means of the useful data connection. Following the connection setup signaling, the second connection controller transmits a connection setup message without the first useful data parameters to the second terminal device. Upon acceptance of the connection by the second terminal device, a connection acceptance message is transmitted by the second terminal device to one of the connection controllers and thereupon the first useful data parameters are transmitted to the second terminal device. Following the arrival of the first useful data parameters at the second terminal device the useful data connection is set up from the second terminal device to the first terminal device.

This method is advantageous in particular if the IP terminal devices support the SIP standard according to RFC3261 or the SIP standard including extensions. Thus, the useful data parameters in SIP messages, e.g. in a connection acceptance acknowledgement (message number 200), according to PRACK (Provisional Reliable Responses Acknowledgement, defined in RFC3262) with messages "Ringing" (message number 180) and "Session Progress" (message number 183), in accordance with the SIP re-invite method and its connection acknowledgement, or in accordance with the SIP update method (defined in RFC3311) and its connection acknowledgement. In this case the useful data parameters are usually encoded in accordance with SDP and transported in SIP messages.

At least one of the connection controllers can preferably buffer useful data parameters. Thus, the first useful data parameters can be stored in one of the two connection controllers and upon connection acceptance transmitted by said connection controller to the second terminal device. By this means the first useful data parameters can be transmitted faster to the second terminal device than if they had first to be requested by the first terminal device. It is advantageous in particular if, in the course of the connection setup signaling, the first useful data parameters are transmitted from the first terminal device to the first connection controller, from there to the second connection controller and are stored in the latter. In this case the first useful data parameters can be available at the connection controller connected directly to the second terminal device, thereby enabling a fast transmission upon connection acceptance.

According to a development of this method, following the arrival of the connection setup message second useful data parameters specific to the second terminal device are transmitted from the second terminal device to the first terminal device. Following the arrival of the second useful data parameters at the first terminal device, a useful data partial connection can then be set up from the first terminal device to the second terminal device.

In a preferred embodiment the useful data connection and/or the useful data partial connection can be set up while bypassing at least one of the connection controllers. In this case the useful data connection and the useful data partial connection can be set up particularly advantageously while bypassing all the connection controllers, with the result that there are no connection controllers in the useful data path and consequently in particular delays and a deterioration of the voice quality, e.g. due to repeated decoding and encoding, can be avoided.

According to a further embodiment, both terminal devices can be connected to the same connection controller.

In a further embodiment, the terminal devices can be linked via a chain of connection controllers. In this case the connection controllers can be connected to one another on a packet-oriented or circuit-oriented basis, and the interconnection performed using standard methods, e.g. in accordance with SIP or H.323, or by means of proprietary methods. In this case it is particularly advantageous if the useful data parameters of the terminal devices can also be transmitted in the course of the signaling between the connection controllers.

In a hierarchical arrangement of the connection controllers, signaling information can be transmitted via a plurality of connection controllers in accordance with the hierarchical arrangement. Accordingly, the signaling information can be forwarded e.g. by the first connection controller to a further intermediate connection controller, and from there to the second connection controller. Subsequent signaling information can then likewise be transmitted via the same connection controllers or directly between two of the connection controllers while bypassing further connection controllers. The latter can be done on the basis of information that connection controllers which are involved in the signaling can extract from the signaling information. Thus, existing signaling partial connections can also be bypassed for that subsequent signaling information which permits no transport of useful data parameters of the terminal devices. In this way signaling can take place between the second terminal device and the first connection controller while bypassing the second and the further connection controllers, in particular when the second terminal device and the first connection controller support H.323 and DMC.

According to a development of the inventive method, a media server, e.g. for generating announcements or for performing call center functions, may be connected to one of the connection controllers—in particular on a packet-oriented basis—or integrated into the connection controller. Accordingly, in the course of the connection setup signaling a preliminary useful data connection, also referred to as an early media payload connection, can be set up between the media server and the first terminal device. It is particularly advantageous in this case if the preliminary useful data connection remains established until the second terminal device accepts the connection, since in this way a response can be given to events, e.g. key being pressed on the first terminal device, during the entire connection setup or, alternatively, the first terminal device can be provided with e.g. announcements or forwarding to a mailbox system.

For the purpose of communication with the first terminal device use can advantageously be made here of the methods "Sipping Early Media" and "Sipping Early Disposition" defined in a draft by the IETF (Sipping: Session Initiation Protocol Project Investigation Working Group).

In a preferred embodiment of the method, subsequent to the arrival of a message transmitted in the course of the connection setup signaling or of the first useful data parameters at the second terminal device, the second terminal device can indicate an incoming connection. In particular an acoustic or visual signal can be output to the user of the second terminal device, or a message can be transmitted to an application which can respond under program control to the connection setup signaling. Such an acoustic signal is, for example, a ringing tone signaling an incoming call on an IP telephone. It is possible for the further steps in the connection setup signaling between the terminal devices and the connection controllers to be performed while the incoming connection is being indicated, so that the direct useful data connection can be switched through quickly when the connection is accepted. Furthermore it is possible that, while the incoming connection is being indicated, the direct useful data connection will not yet be set up so that a possibly existing preliminary useful data connection can continue to be used.

According to a development of this method, subsequent to the acceptance of the connection by the second terminal device and the arrival of the second useful data parameters at the first terminal device, third useful data parameters specific to the first terminal device can be transmitted from the first terminal device to the second terminal device. The third useful data parameters can be different here from the first useful data parameters in order, for example, to respond to changed communication conditions. For example, a different coding method or a different address for receiving useful data can be specified in the third useful data parameters.

BRIEF DESCRIPTION OF THE DRAWINGS

An exemplary embodiment of the invention is explained in more detail below with reference to the drawing, in which.

DETAILED DESCRIPTION OF INVENTION

FIGS. 1-9 show a communication system having two IP telephones as first and second terminal device EG1, EG2 in a schematic representation. The first terminal device EG1— alternatively also an IP softclient or a multimedia application—is connected on a packet-oriented basis via a packet-oriented network PON to a first gateway VS1 as first call controller. In this arrangement the first gateway VS1 is connected to the communication equipment KE1 on a circuit-oriented basis, said communication equipment KE1 being implemented as a convergence communication server for the direct connection of circuit-oriented terminal devices (not shown) and for connecting packet-oriented terminal devices via the first gateway VS1. According to SIP terminology, a gateway is, in this context, what is referred to as a "SIP back-to-back user agent" (B2BUA). Also connected to the gateway VS1 is a media server MS, which in turn has a packet-oriented interface to the packet-oriented network PON. The second terminal device EG2 is connected via the packet-oriented network PON to a second gateway VS2 which is connected in turn via a circuit-oriented interface to a communication equipment KE2. Further connection controllers VSA and VSB are also connected to the packet-oriented network PON. In addition, the further connection controllers VSA, VSB each have an interface to a circuit-oriented network LON, e.g. a private or public ISDN or analog network.

FIGS. 1-9 illustrate connections and messages in the communication system which are transmitted within the framework of the present exemplary embodiment. Signaling connections SIG,DSIG in the course of the connection setup signaling are represented by solid lines, provided with double arrows, between the components in the signaling, and messages M,M1,M2,MMS which are transmitted via these signaling connections SIG,DSIG by single arrows. Useful data connections NV, useful data partial connections NTV and preliminary useful data connections VNV are depicted by dashed lines provided with double arrows.

Preferably what is referred to as real-time communication such as voice and/or video, in particular according to the RTP protocol (RTP: Real-Time Protocol), is transmitted via the useful data connection NV and the useful data partial connection NTV. Furthermore the useful data connection NV is in particular a directed, packet-oriented connection originating from the second terminal device EG2 in the direction of the first terminal device EG1, and the useful data partial connection NTV is in particular a directed, packet-oriented connection originating from the first terminal device EG1 in the direction of the second terminal device EG2. Thus, a bidirectional communication is possible between the first and second terminal device EG1, EG2 by means of the useful data connection NV and the useful data partial connection NTV.

Useful data parameters P1,P2,PMS stored at least temporarily in a component are represented by a small rectangle inside or in the immediate environment of the component.

A message without useful data parameters P1,P2,PMS of one of the terminal devices is designated by M, a message with useful data parameters P1 of the first terminal device by M1, a message with useful data parameters P2 of the second terminal device by M2, a message with useful data parameters PMS of the media server by MMS. Acknowledgement messages usually present in communication protocols serving as confirmation of a received message are not shown in the figures, except when the acknowledgement message is used for transmitting useful data parameters P1,P2,PMS. In addition, messages that are sent sequentially in time are often shown in a figure if said messages are directly or indirectly dependent on the same event.

For the present exemplary embodiment let it be assumed that the communication equipment KE1 is configured such that a connection request from a packet-oriented terminal device from the subnetwork managed by the communication equipment KE1 is transmitted to a called terminal device outside said subnetwork, from the gateway VS1 to the gateway VSA. In the gateway VSA a check is made to determine whether the called terminal device is located in its managed subnetwork. If it is not, the connection request is forwarded to the gateway VSB. There, an analog check takes place. If the called terminal device is also not located in the subnetwork managed by the gateway VSB, the connection request is forwarded to the gateway VS2. In the exemplary embodiment let the called terminal device be located in the packet-oriented subnetwork managed by the gateway VS2. Thus, the gateway VS2 can transmit packets and messages that are intended for the called terminal device to said called terminal device.

The forwarding of the connection request from one gateway to another gateway can in this case be performed in particular on the basis of a partial analysis of an address, used in the connection request, of the second terminal device EG2.

In the exemplary embodiment it is also to be possible for the terminal devices EG1, EG2 and the gateways VS1, VS2, VSA, VSB to communicate directly via the packet-oriented network PON provided the cited components know an address of a respective communication partner and so can address it directly.

Let it also be assumed that the first terminal device EG1 and the first gateway GW1 support the SIP protocol with "Sipping Early Media" and "Sipping Early Disposition" extensions according to IETF. Let the connection between the first gateway VS1 and the further gateway VSA, the further gateway VSB and the second gateway VS2, as well as the second gateway VS2 and the second terminal device EG2 be possible using standard SIP methods. Let the connection between the further gateways VSA and VSB be possible via a proprietary, circuit-switched protocol, with it being possible in a proprietary signaling protocol to transmit useful data parameters from terminal devices between the further gateways VSA,VSB.

Figure 1:
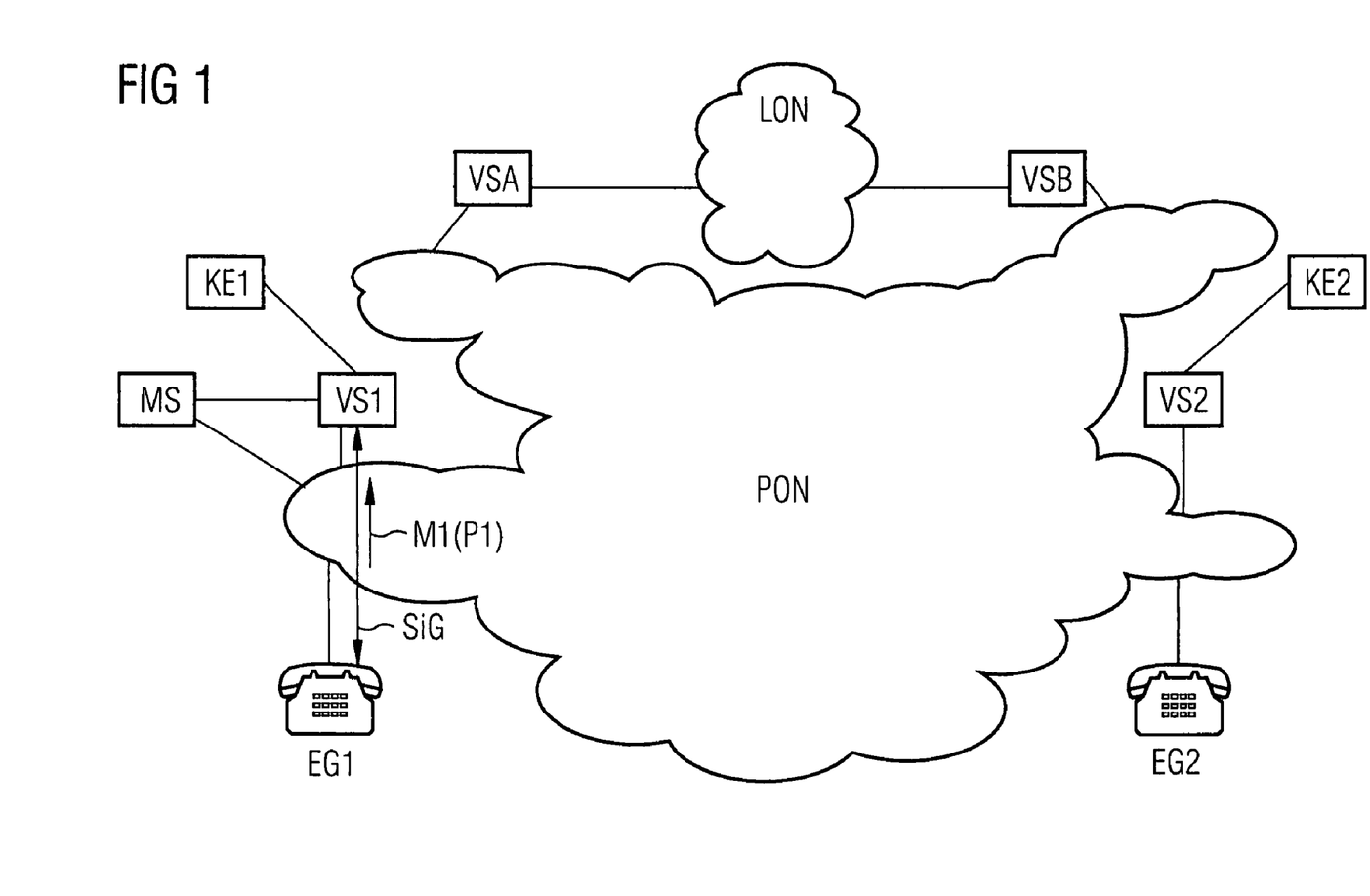
FIG. 1 is a schematic diagram of an exemplary initiation of a connection setup in a communication system.

In FIG. 1 the initiation of the connection setup is represented schematically by the first terminal device EG1. In particular by dialing a call number of the second terminal device EG2, the first terminal device EG1 initiates connection setup signaling to the first gateway VS1 in the course of the signaling connection SIG. In this signaling process the message M1 containing useful data parameters P1 of the first terminal device is transmitted to the first gateway VS1.

Figure 2:
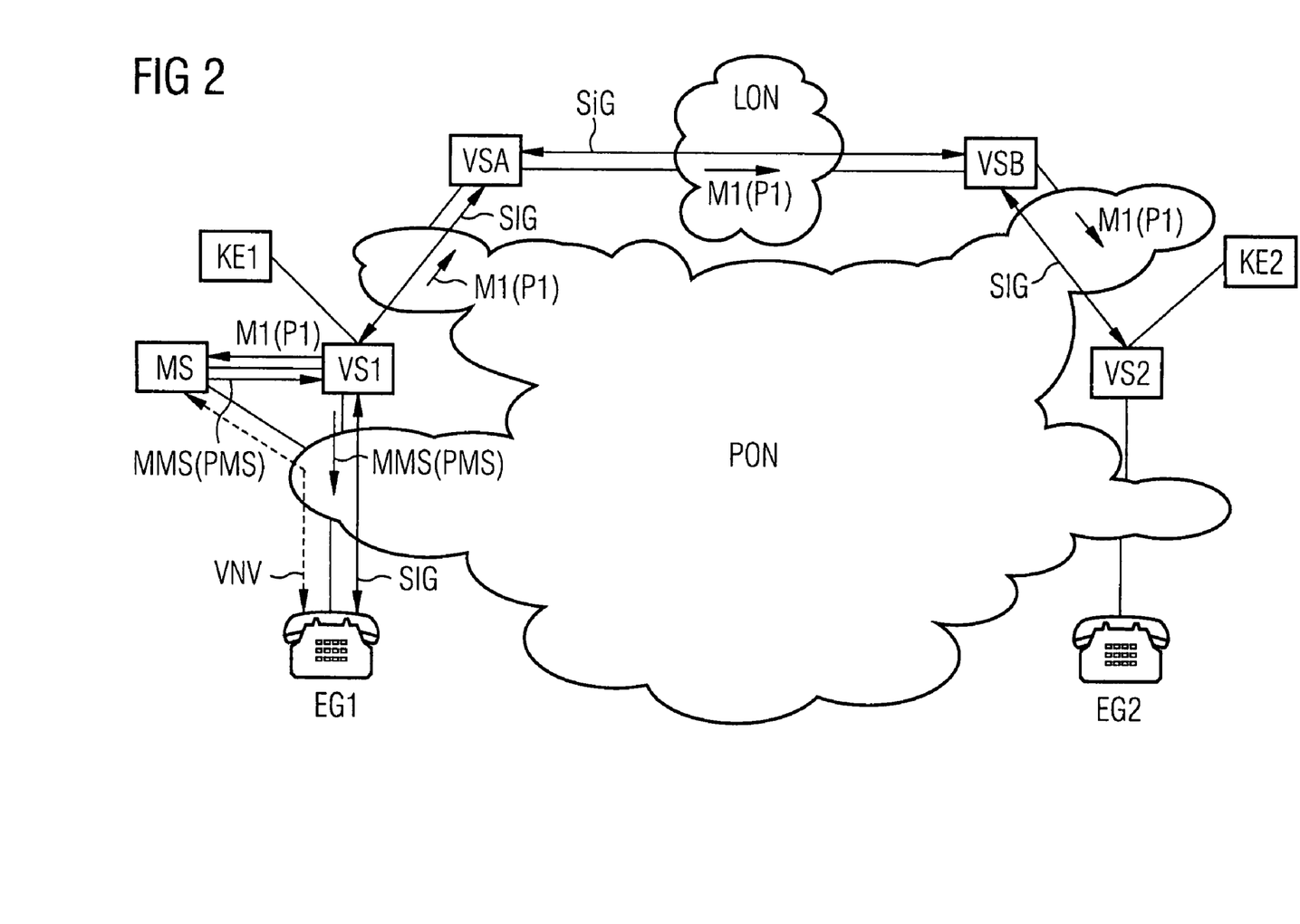
FIG. 2 is a schematic diagram of an exemplary transmission in a communication system of the first data parameters.

The first gateway VS1 recognizes e.g. on the basis of configured rules in the gateway VS1 or in the communication equipment KE1 that the connection setup signaling is to be set up as part of the signaling connection SIG to the further gateway VSA and that in parallel a preliminary useful data connection VNV—also referred to as an early media connection—is to be set up to the media server MS. FIG. 2 shows in a schematic representation that the first terminal device EG1 transmits its useful data parameters as first useful data parameters P1 specific to the first terminal device EG1 for the preliminary useful data connection VNV that is to be set up in the signaling message M1 to the first gateway VS1 and said first useful data parameters P1 are forwarded from there to the media server MS. The media server MS thereupon transmits its useful data parameters PMS in the signaling message MMS to the first terminal device EG1. This can take place via the first gateway VS1 or by means of a direct connection. Thus, the preliminary useful data connection VNV can be set up between the media server MS and the first terminal device EG1 using the transmitted useful data parameters P1,PMS. A service of this preliminary useful data connection VNV may be, for example, announcements which are transmitted to the first terminal device EG1. Furthermore the media server MS can respond to key depressions at the first terminal device EG1 by causing, for example, an abortion of the connection setup to the second terminal device EG2 as a reaction to the pressing of the "#" key and by connecting the first terminal device EG1 to an operator or a voice information server or an answering machine function.

During the setup and during the existence of the preliminary useful data connection VNV to the media server MS the connection setup signaling is transmitted with the message M1 containing the first useful data parameters P1 to the further gateway VSA. As a result thereof the connection setup signaling is set up between the further gateways VSA and VSB in which signaling information the first useful data parameters is transmitted in the message M1 to the further gateway VSB. The further gateway VSB thereupon sets up the connection setup signaling to the second gateway VS2 and transmits the message M1 containing the first useful data parameters P1.

Figure 3:
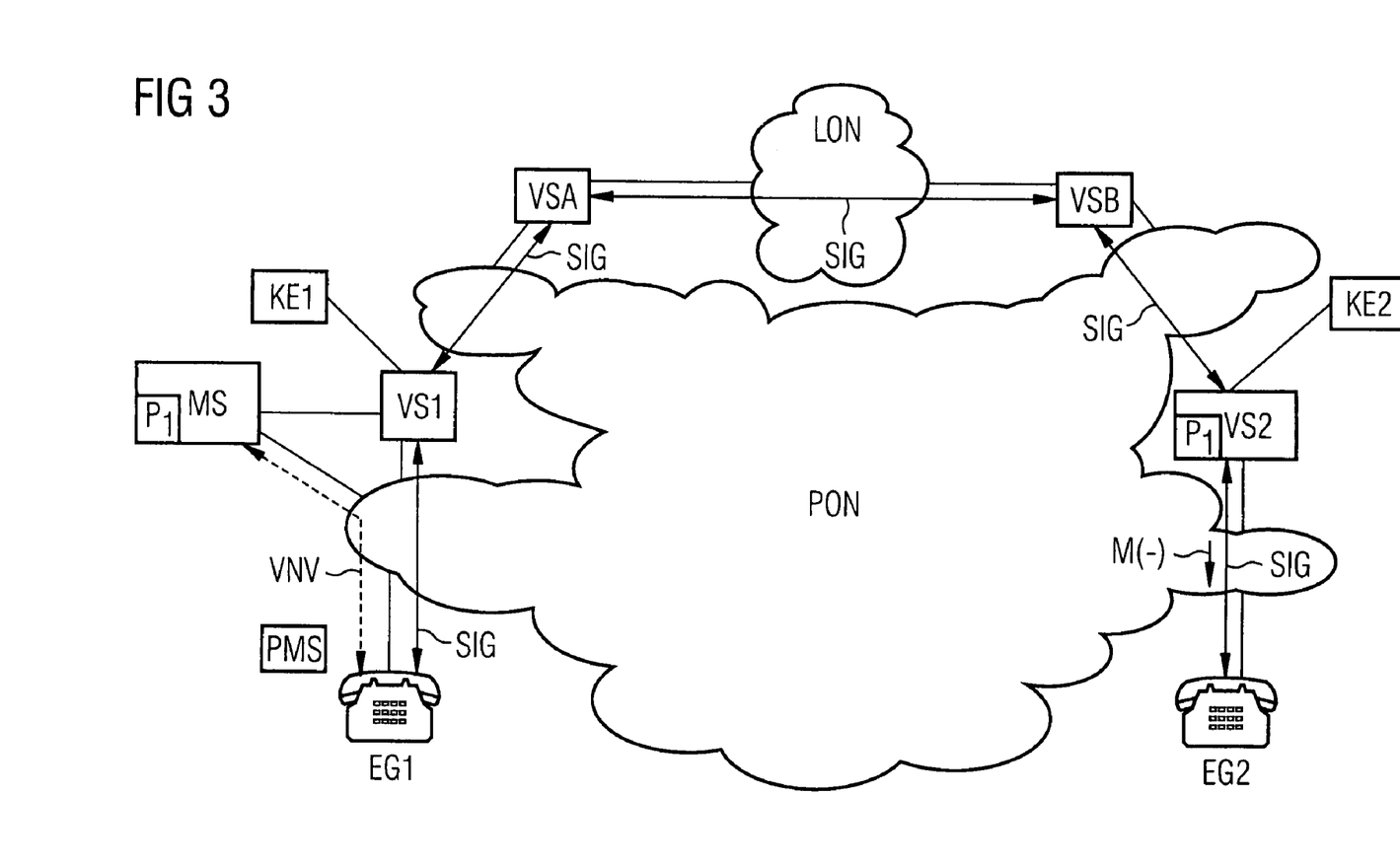
FIG. 3 is a schematic diagram of an exemplary transmission in a communication system of a connection setup without the first data parameters.

As a result of the received connection setup signaling, a connection setup message M without the first useful data parameters P1 is transmitted by the second gateway VS2 to the second terminal device EG2—shown in FIG. 3. In this case the first useful data parameters P1 are held back in the second gateway VS2. The second gateway VS2 also stores the received first useful data parameters P1 in a memory of the second gateway VS2. As the second terminal device EG2 has not yet received the first useful data parameters P1 in this phase of the method, no direct useful data connection is yet set up from the second terminal device EG2 to the first terminal device EG1. Following the arrival of the connection setup message M, the second terminal device EG2 indicates an incoming connection to a user of the second terminal device EG2 by outputting, for example, an acoustic ringing tone and/or performs a visual output to a display via an LED and/or via a graphical user interface.

Also shown in FIG. 3 is that the media server MS has stored the first useful data parameters P1 for the preliminary useful data connection VNV, and that the first terminal device EG1 has stored the useful data parameters PMS of the media server MS.

Figure 4:
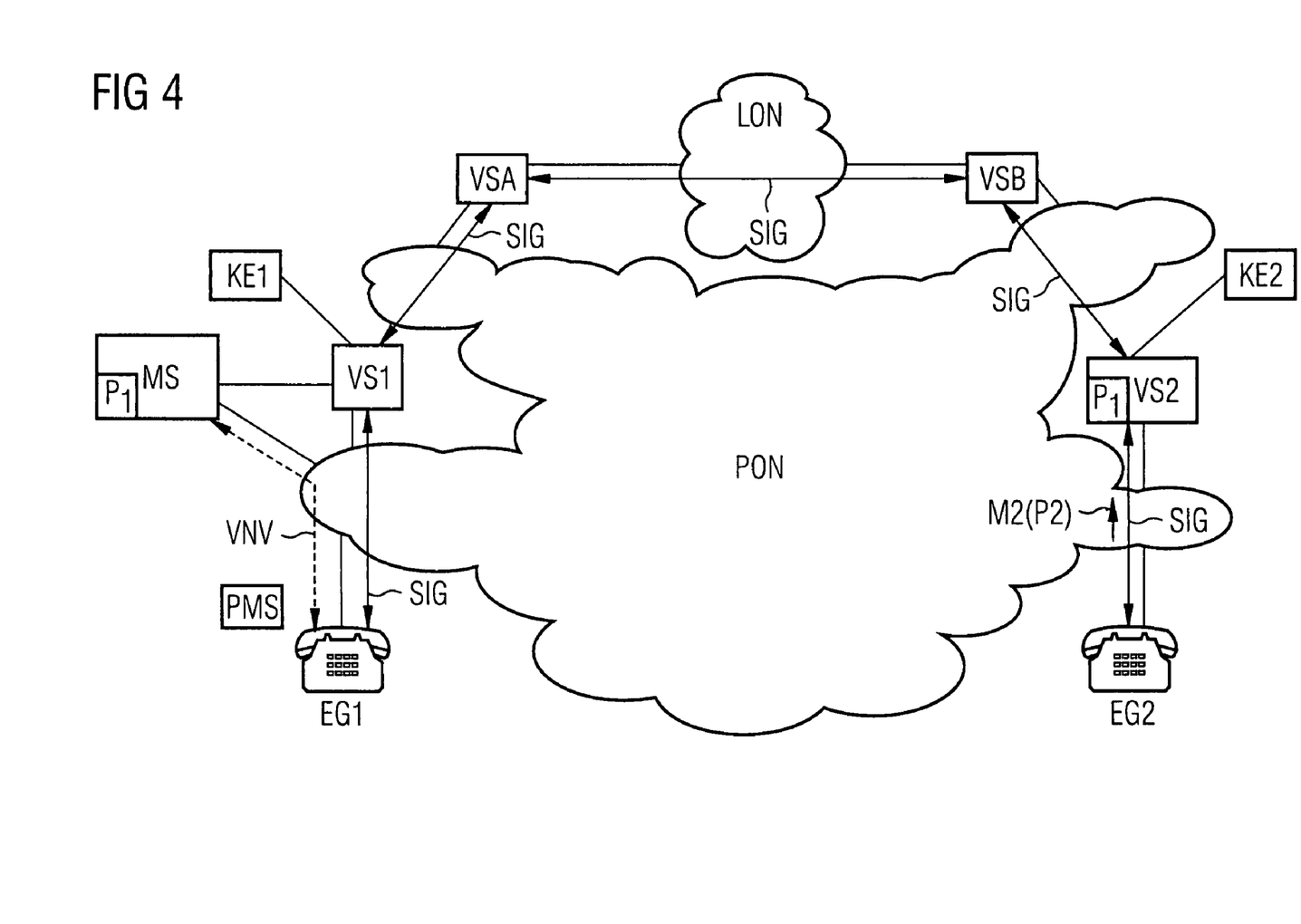
FIG. 4 is a schematic diagram of an exemplary transmission in a communication system of the second data parameters.

FIG. 4 is a schematic showing that the second terminal device EG2 transmits its second useful data parameters P2, which are specific to the second terminal device EG2, to the second gateway VS2 in the message M2 following the arrival of the connection setup message M. This can happen, for example, in an acknowledgement of the connection setup message M.

Figure 5:
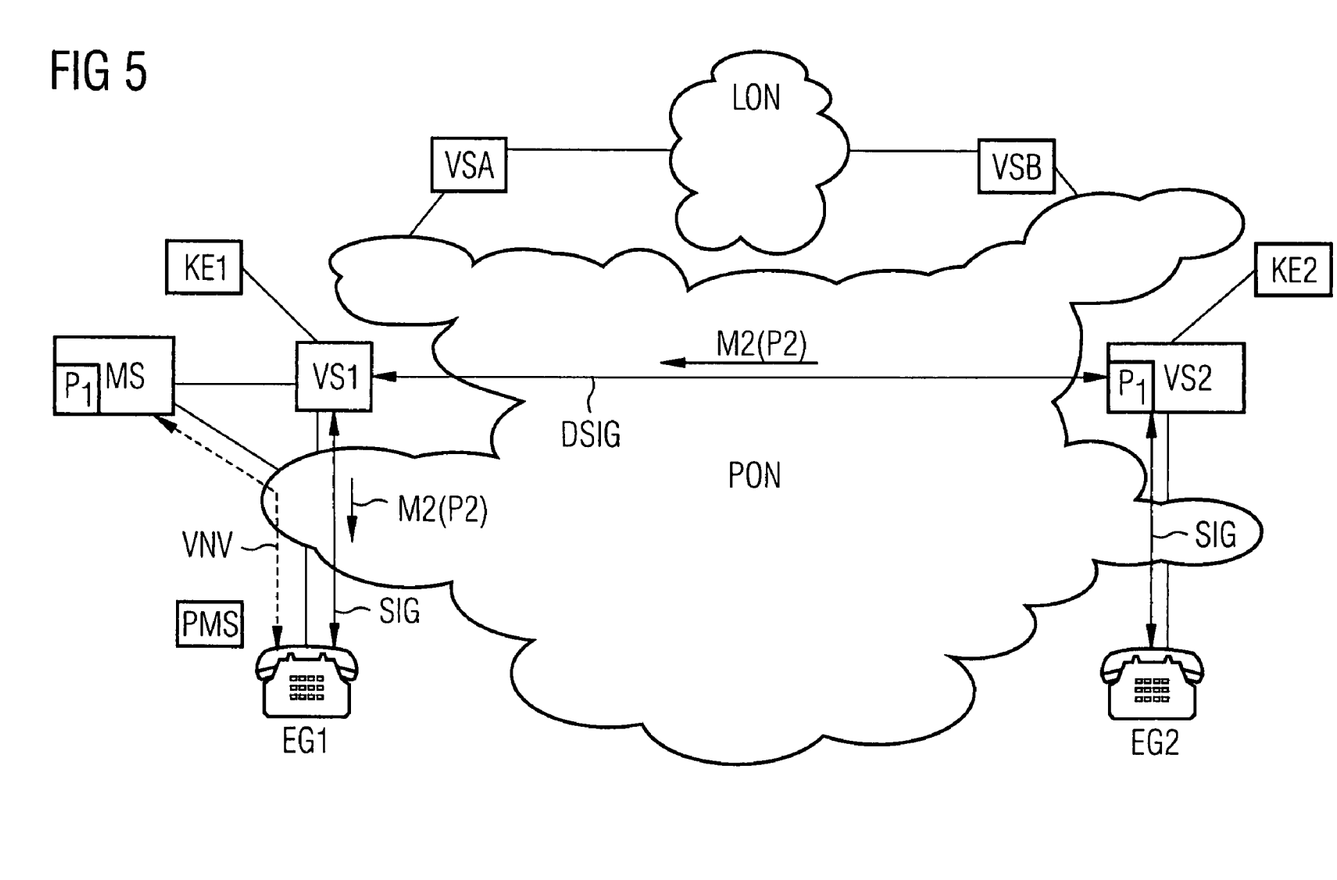
FIG. 5 is a schematic diagram of an exemplary replacement or an extension of the signaling connection in a communication system.

FIG. 5 illustrates a replacement or an extension of the signaling connection SIG by a direct signaling connection DSIG. At least one of the gateways VS1, VSA, VSB involved in the original signaling connection SIG is known—e.g. on account of the signaling shown in FIG. 2—to the second gateway VS2. This means that the second gateway VS2 can set up the direct signaling connection DSIG to the first gateway VS1 while bypassing the further gateways VSA, VSB. A message M2 containing the second useful data parameters P2 is then transmitted via this direct signaling connection DSIG. Subsequently thereto, the second useful data parameters P2 are transmitted in a message M2 to the first terminal device EG1 by the first gateway VS1.

Alternatively (not shown), the second useful data parameters P2 could also be stored in the first gateway VS1 and not be transmitted to the first terminal device EG1 until later. This can depend, for example, on which SIP methods the first terminal device EG1 supports for transmitting useful data parameters.

As an alternative to the direct signaling connection DSIG, the second useful data parameters P2 could be transmitted via the original signaling connection SIG from the second gateway VS2, via the further gateways VSB and VSA, to the first gateway VS1 (not shown).

Furthermore the signaling connection SIG between the second gateway VS2 and the further gateway VSB, between the further gateway VSB and the further gateway VSA and between the further gateway VSA and the first gateway VS1 could be cleared down as a result of the setting up of the direct signaling connection DSIG between the second gateway VS2 and the first gateway VS1. Alternatively said signaling connection SIG can continue to be maintained. As said signaling connection SIG between the first gateway VS1, the further gateways VSA and VSB and the second gateway VS2 is not relevant in the following, it is not shown further in FIG. 5 and the following figures.

Figure 6:
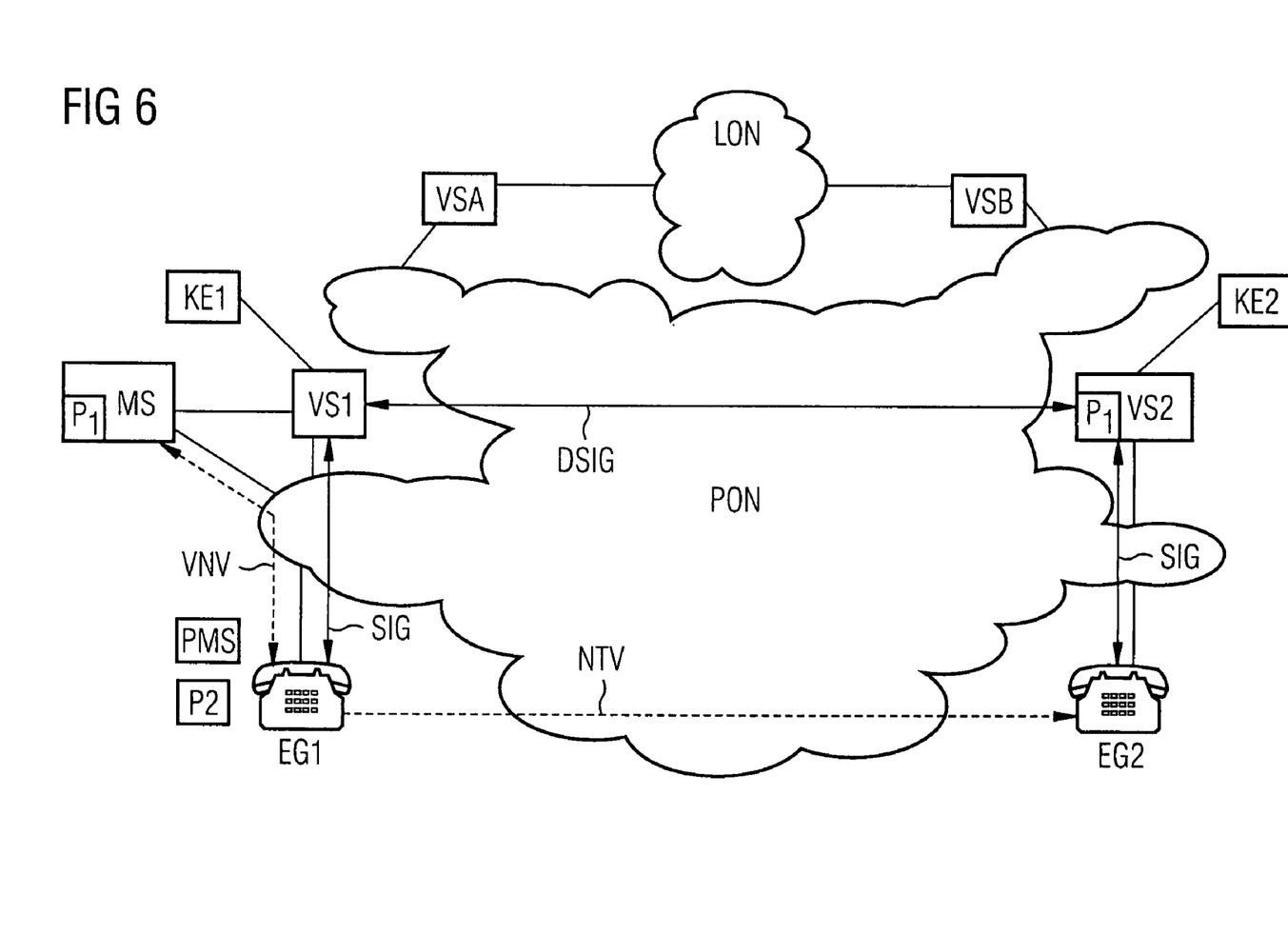
FIG. 6 is a schematic diagram of an exemplary partial connection set up in a communication system.

Following the arrival of the second useful data parameters P2 at the first terminal device EG1, a useful data partial connection NTV is set up, as shown in FIG. 6, by the first terminal device EG1 to the second terminal device EG2 while bypassing the gateways VS1,VS2,VSA,VSB. This is a unidirectional, directed connection originating from the first terminal device EG1 to the second terminal device EG2. This useful data partial connection NTV is thus already set up prior to connection acceptance by the second terminal device EG2. This is advantageous to the extent that after the acceptance of the connection by the second terminal device EG2 a bidirectional useful data connection can be used without any great delay, without the need first to perform the time-consuming task of setting up a useful data partial connection NTV.

Figure 7:
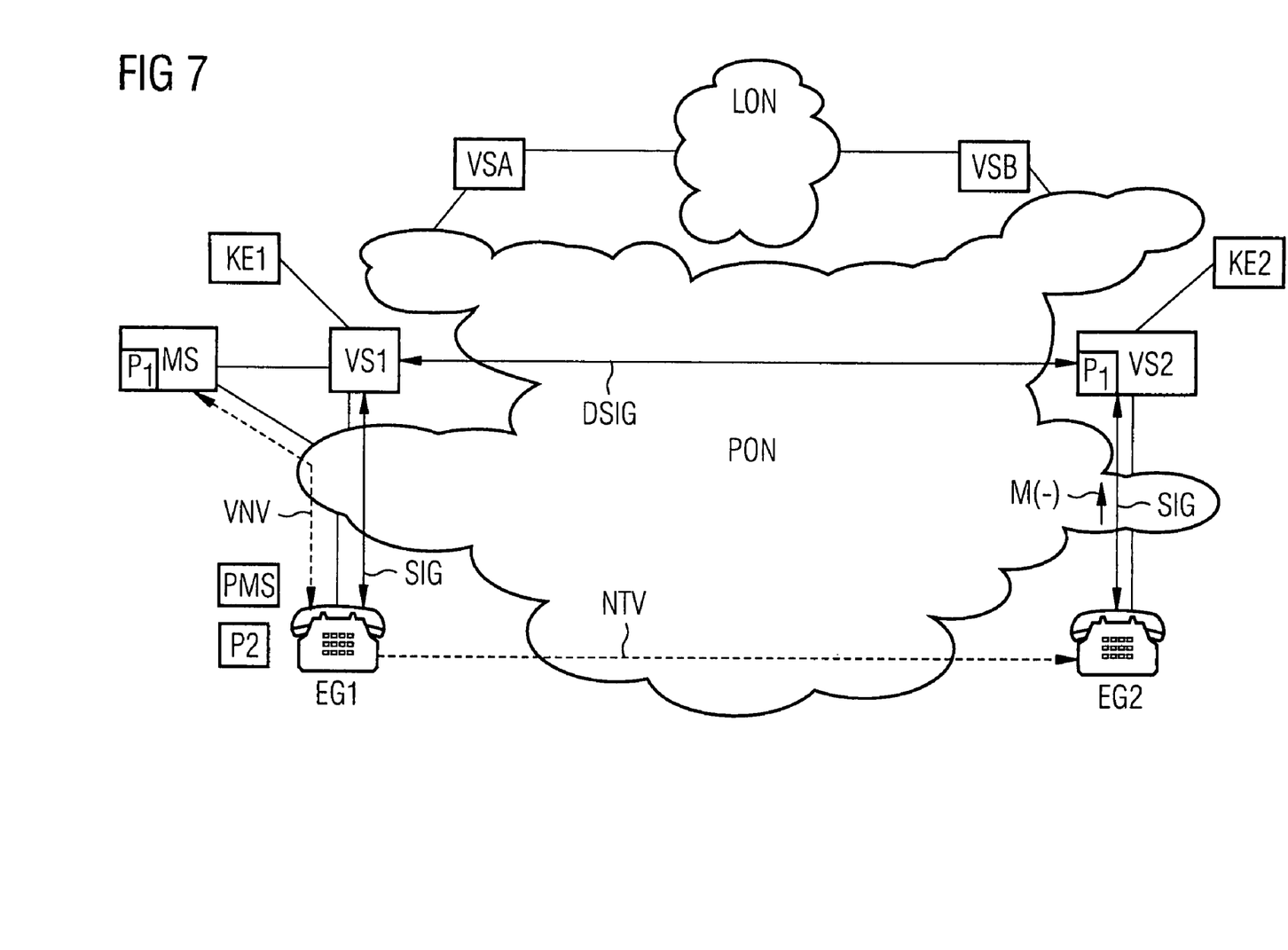
FIG. 7 is a schematic diagram of an exemplary transmission in a communication system of a connection acceptance message without the second data parameters.

Upon connection acceptance by the second terminal device EG2—in particular by the picking up of a telephone handset or the pressing of a key—a connection acceptance message M is transmitted without useful data parameters P2 of the second terminal device EG2 from the second terminal device EG2 to the second connection controller VS2—shown in FIG. 7.

Figure 8:
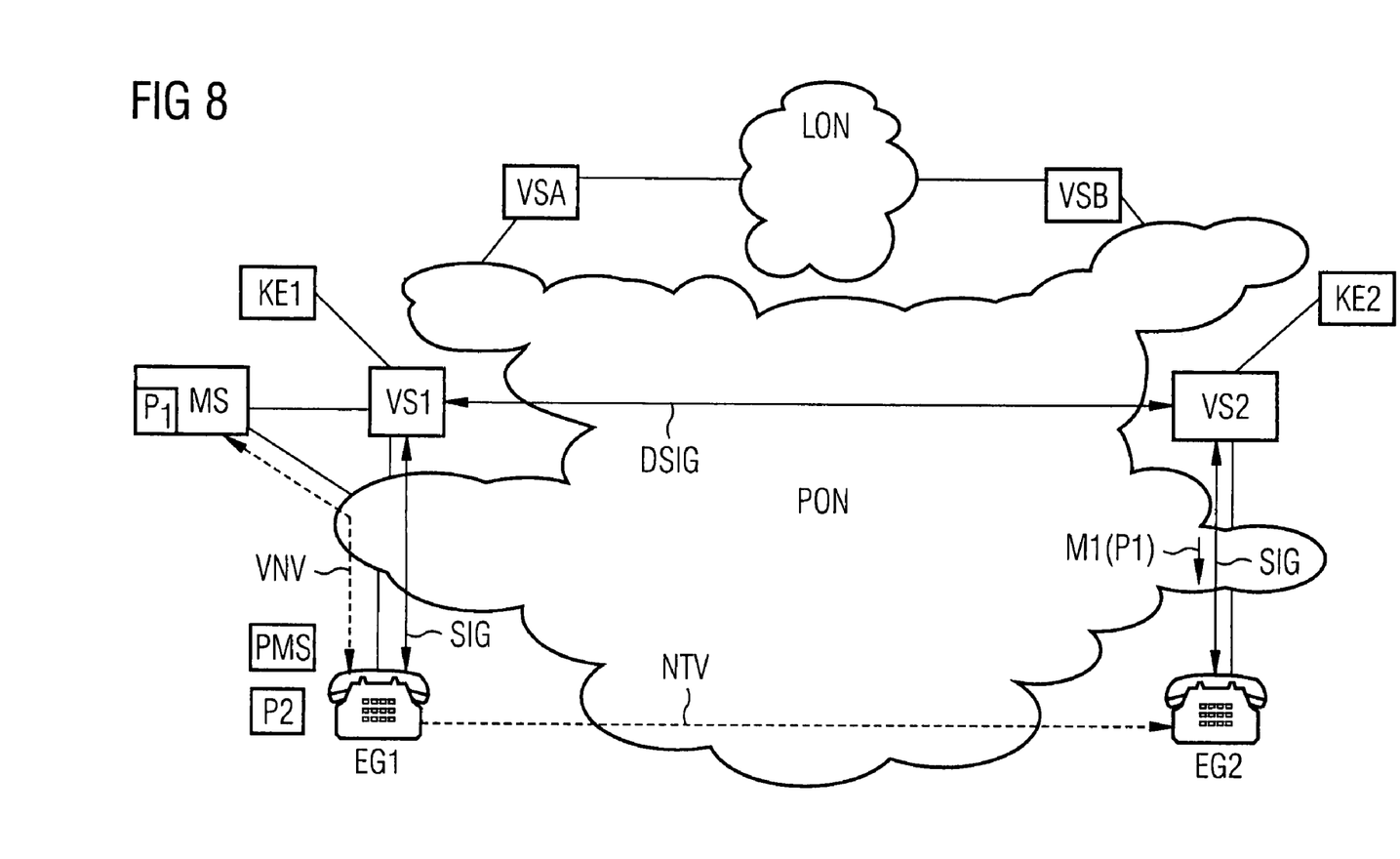
FIG. 8 is another schematic diagram of an exemplary transmission in a communication system of the first data parameters.

Subsequently, as shown in FIG. 8, the previously stored first useful data parameters P1 are transmitted to the second terminal device EG2 in a message M1 with the first useful data parameters P1 by the gateway VS2. This message M1 can be in particular an acknowledgement to the connection acceptance message M. Because the first useful data parameters P1 are transmitted by the second gateway VS2 and consequently by the direct communication partner of the second terminal device EG2, the delay between the connection acceptance and the arrival of the first useful data parameters P1 at the second terminal device EG2 is very small.

Figure 9:
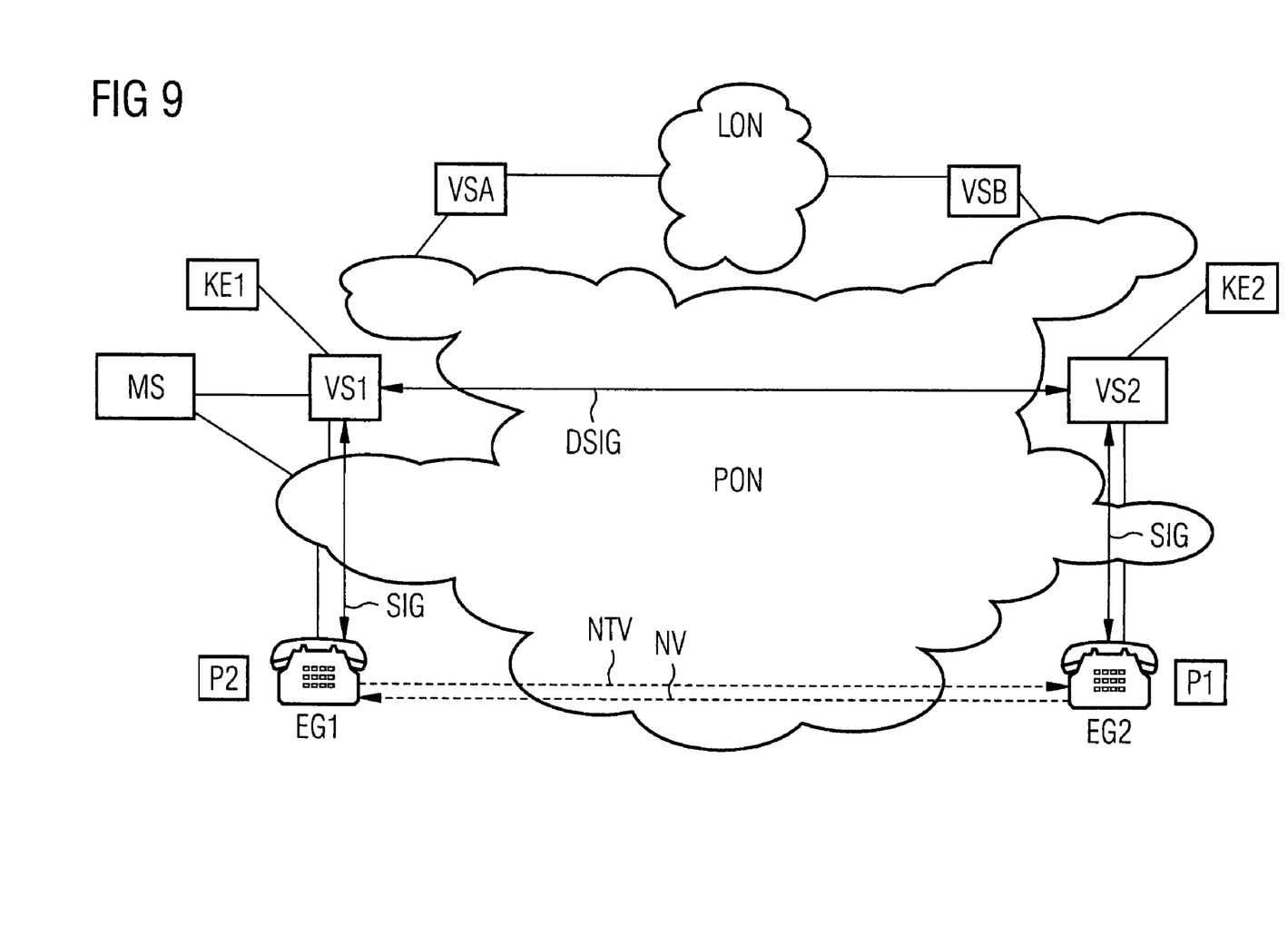
FIG. 9 is a schematic diagram of an exemplary set up in a communication system of a data connection between a second terminal to a first terminal.

In FIG. 9, following the arrival of the first useful data parameters P1 at the second terminal device EG2, a direct, e.g. unidirectional, useful data connection NV is set up from the second terminal device EG2 to the first terminal device EG1 while bypassing the gateways VS1,VS2,VSA,VSB. As a result a bidirectional, direct communication is possible between the two terminal devices EG1 and EG2. Owing to the setting up of the useful data connection NV the preliminary useful data connection VNV is also cleared down. Messages possibly required for this purpose are not shown in the figure.

With this method it is advantageous in particular that owing to the direct communication delays in the connection controllers and deteriorations of the voice quality due to repeated recoding of the useful data can be avoided. It is also advantageous that a direct useful data connection can be implemented between SIP terminal devices.

In the exemplary embodiment the first terminal device EG1 supports the SIP protocol with "Sipping Early Media" and "Sipping Early Disposition" extensions. This is advantageous in so far as these extensions are provided for the inclusion of a preliminary useful data connection, in this case VNV.

Several alternative embodiments that are not shown in the figures are presented in the following.

In a first alternative embodiment variant, the gateways VS1,VS2,VSA,VSB can use the H.323 protocol for signaling between the gateways involved. Furthermore the second terminal device EG2 can support the direct media connection standard H.323/DMC. This means that following the arrival of the connection setup message the second terminal device EG2 can transmit the second useful data parameters P2 directly to the first connection controller VS1 by means of H.323, bypassing the second and the further connection controllers VS2, VSA, VSB. Furthermore this enables a direct useful data connection to be set up between a first terminal device EG1 conforming to the SIP standard and a second terminal device EG2 conforming to the H.323/DMC standard.

In a second embodiment variant the connection between the further gateways VSA and VSB does not support useful data parameter transmission. In this case, in the course of the signaling connection SIG, the first useful data parameters P1 can be stored in the first gateway VS1 instead of in the second gateway VS2. The signaling connection SIG from the first gateway VS1 via the further gateways VSA and VSB to the second gateway VS2 takes place as shown in FIG. 2, except that the first useful data parameters P1 are not transported to the aforementioned gateways. Only after the second useful data parameters P2 are transmitted by means of the direct signaling connection DSIG from the second gateway VS2 to the first gateway VS1 are the stored first useful data parameters P1 transmitted in an acknowledgement from the first gateway VS1 to the second gateway VS2 and stored there. The steps that now follow for setting up the useful data connection can then correspond to the above description for FIG. 6 and following. This method is advantageous in particular as a result of the fact that the further gateways VSA and VSB do not necessarily have to be able to send and receive messages containing first and second useful data parameters P1,P2.

In a third embodiment variant the first terminal device EG1 supports the SIP update method according to RFC3311. Support for the drafts "Sipping Early Media" and "Sipping Early Disposition" is not necessary. In this case, as shown in FIGS. 1-5, the first useful data parameters P1 are transmitted to the second connection controller VS2 and stored there. The second useful data parameters P2 are transmitted via a direct signaling connection SIG from the second gateway VS2 to the first gateway VS1 and from there onward to the first terminal device EG1. A SIP update method is used here for transmitting the second useful data parameters P2 to the first terminal device EG1. In the associated acknowledgement new, third useful data parameters specific to the first terminal device EG1 are transmitted from the first terminal device EG1 to the first gateway VS1, as the first useful data parameters P1 are only valid for the preliminary useful data connection VNV. Subsequently thereto, the third useful data parameters are transmitted from the first gateway VS1 in a message to the second gateway VS2. There, the third useful data parameters are stored until they are transmitted to the second terminal device EG2 as a result of the connection acceptance by said second terminal device EG2.

In a fourth embodiment variant the first terminal device EG1 supports the SIP re-invite method. As shown in FIGS. 1-5, the first useful data parameters P1 of the second connection controller VS2 are transmitted and stored there and the second useful data parameters P2 are transmitted via a direct signaling connection DSIG from the second gateway VS2 to the first gateway VS1 and stored there. Upon connection acceptance by the second terminal device EG2 the stored second useful data parameters P2 are transmitted from the first gateway VS1 to the first terminal device EG1 using the SIP re-invite method. A connection acceptance acknowledgement from the second gateway VS2 to the second terminal device EG2 is not yet sent, but is held back. Following the arrival of the second useful data parameters P2 at the first terminal device EG1, the latter sends new, third useful data parameters specific to the first terminal device EG1 from the first terminal device EG1 to the first gateway VS1 and from there onward, via the direct signaling connection DSIG, to the second gateway VS2. The third useful data parameters are now transmitted by the second gateway VS2 to the second terminal device EG2 in the connection acceptance acknowledgement that was held back until this time.

In a fifth embodiment variant the first terminal device EG1 uses standard SIP methods according to RFC3261 for the signaling. As shown in FIGS. 1-3, the first useful data parameters P1 of the second connection controller VS2 are transmitted. From there they are transmitted in a message, preferably the SIP re-invite message, to the second terminal device EG2. In this case an acknowledgement message from the first connection controller VS1 to the first terminal device EG1 is initially held back. Subsequently thereto, a directed useful data connection NV is set up from the second terminal device EG2 to the first terminal device EG1. An incoming connection is also indicated acoustically and/or visually to the user. Furthermore, following the arrival of the first useful data parameters P1 at the second terminal device EG2 the second useful data parameters P2 are transmitted to the second connection controller VS2, from there to the further call controller VSB and from there onward to the further call controller VSA. The second useful data parameters P2 are transmitted from the further call controller VSA to the first call controller VS1 and from there by means of a SIP acknowledgement message containing one of the message numbers 180, 183 or 200 to the first terminal device EG1. A directed, direct useful data partial connection NTV from the first terminal device EG1 to the second terminal device EG2 is subsequently set up, with received useful data packets being discarded at the second terminal device EG2 because the latter has not yet accepted the connection. Upon connection acceptance by the second terminal device EG2 a direct, bidirectional useful data communication is then immediately possible.

The sixth embodiment variant of the method is a variation of the fifth embodiment variant, wherein when the second useful data parameters P2 are transmitted to the first connection controller VS1 and in the further procedure a direct signaling connection DSIG is set up between the second connection controller VS2 and the first connection controller VS1. The useful data parameters are transmitted by means of the above-mentioned SIP acknowledgement messages via the direct signaling connection DSIG.

In a seventh embodiment variant, based on the fifth and/or sixth embodiment variant of the method, the gateways VS1, VS2,VSA,VSB use the H.323 protocol for the signaling between the gateways involved. Furthermore the second terminal device EG2 can support the direct media connection standard H.323/DMC. As a result, following the arrival of the connection setup message, the second terminal device EG2 can transmit the second useful data parameters P2 directly to the first connection controller VS1, bypassing the second and the further connection controllers VS2, VSA, VSB. Furthermore this enables a direct useful data connection between a first terminal device conforming to the SIP standard and a second terminal device conforming to the H.323/DMC standard.

In an eight embodiment variant, based on the fifth and/or sixth embodiment variant of the method, the connection between the further gateways VSA and VSB does not support the transmission of useful data parameters. Consequently, in the course of the signaling connection SIG, the first useful data parameters P1 are stored in the first gateway VS1 instead of in the second gateway VS2. The signaling connection SIG from the first gateway VS1 via the further gateways VSA and VSB to the second gateway VS2 takes place as shown in FIG. 2, except that the first useful data parameters P1 are not transported in the messages to the aforementioned gateways. Only after the second useful data parameters P2 are transmitted via the cited SIP acknowledgement messages by means of the direct signaling connection DSIG from the second gateway VS2 to the first gateway VS1 are the stored first useful data parameters P1 transmitted in one of the SIP acknowledgement messages from the first gateway VS1 to the second gateway VS2 and stored there. The steps that now follow for setting up the useful data connection NV can then correspond to the above description for FIG. 6 and following. This method is advantageous in particular as a result of the fact that the further gateways do not necessarily have to be able to send and receive messages containing first and second useful data parameters P1,P2.

The invention claimed is:

1. A method for setting-up a data connection between a first terminal device connected to a first connection controller and a second terminal device connected to a second connection controller, comprising:

establishing signaling connections from the first terminal device to the first connection controller, thence to at least one intermediate controller, thence to the second connection controller;

transmitting a setup message comprising first useful data parameters comprising address information specific to the first terminal device from the first terminal device to the second connection controller over the established signaling connections;

storing the first useful data parameters in the second connection controller;

transmitting the connection setup message without the first useful data parameters from the second connection controller to the second terminal device;

transmitting an acknowledgement message from the second terminal device to the second connection controller;

setting-up a direct connection between the second connection controller and the first connection controller, bypassing the at least one intermediate controller;

transmitting second useful data parameters comprising address information specific to the second terminal device from the second terminal device to the first terminal device via the direct connection;

setting-up a first unidirectional connection from the first terminal device to the second terminal device via the first and second connection controllers, bypassing the at least one intermediate controller;

transmitting the stored first useful data parameters from the second connection controller to the second terminal device;

setting-up a second unidirectional connection from the second terminal device to the first communication device via the first and second connection controllers, bypassing the at least one intermediate controller; and transmitting useful data bi-directionally between the first and second terminal devices using the first and second unidirectional connections, wherein a media server is connected to one of the connection controllers, and wherein a preliminary data connection is set up between the media server and the first terminal device during initial connection setup signaling.

2. The method as claimed in claim 1, further comprising indicating an incoming connection by the second terminal device.

3. The method as claimed in claim 1, wherein a connection acceptance acknowledgement containing the first useful data parameters is transmitted from the second connection controller to the second terminal device after the second connection controller receives an acceptance of the first unidirectional connection by the second terminal device.

4. The method as claimed in claim 1, further comprising tearing down the preliminary data connection after setting up the second unidirectional connection.

5. The method as claimed in claim 1, wherein a message is transmitted without the second useful data parameters to the first terminal device during the connection setup signaling and after the second useful data parameters are received at the first connection controller.

6. The method as claimed in claim 1, wherein third useful data parameters specific to the first terminal device are transmitted from the first terminal device to the second terminal device after the arrival of the second useful data parameters at the first terminal device.

7. The method as claimed in claim 1, further comprising clearing the established signaling connections of the at least one intermediate controller after setting-up the direct connection between the second connection controller and the first connection controller.

8. A method for setting-up a data connection between a first terminal device connected to a first connection controller and a second terminal device connected to a second connection controller, comprising:

provSubTitleiding a media server that responds to key depressions in, and transmits announcements to, terminal devices;

transmitting a first connection setup message comprising first useful data parameters from the first terminal device to the first connection controller and to the media server, wherein the first useful data parameters comprise address information of the first terminal device;

setting-up a preliminary useful data connection between the media server and the first terminal device, wherein the preliminary useful data connection operates in parallel with setting-up the data connection between the first and second terminal devices;

establishing a signaling connection between the first connection controller and a first intermediate connection controller, and transmitting the first connection setup message from the first connection controller to the first intermediate connection controller using a packet-switched Internet Protocol;

establishing a signaling connection between the first intermediate connection controller and a second intermediate connection controller, and transmitting the first connection setup message from the first intermediate connection controller to the second connection controller using a circuit-switched protocol;

establishing a signaling connection between the second intermediate connection controller and the second connection controller, and transmitting the first connection setup message from the second intermediate connection controller to the second connection controller using the packet-switched Internet Protocol;

storing the first useful data parameters in the second connection controller;

transmitting the first connection setup message without the first useful data parameters from the second connection controller to the second terminal device;

transmitting a connection acknowledgement message comprising second useful data parameters specific to the second terminal device from the second terminal device to the second connection controller;

establishing a direct signaling connection between the second and first connection controllers, and transmitting the acknowledgement message directly from the second to the first connection controller, thence to the first terminal device, bypassing the intermediate connection controllers;

clearing the signaling connections between the second connection controller and the second intermediate connection controller, between the second intermediate connection controller and the first intermediate connection controller, and between the first intermediate connection controller and the first connection controller;

setting-up a first unidirectional useful data connection from the first terminal device to the second terminal device using the direct signaling connection and bypassing the intermediate connection controllers;

transmitting an acceptance message without the second useful data parameters from the second terminal device to the second connection controller;

transmitting the first useful data parameters from the second connection controller to the second terminal device;

setting-up a second unidirectional useful data connection from the second terminal device to the first terminal device using the direct signaling connection and bypassing the intermediate connection controllers;

clearing the preliminary useful data connection; and performing bi-directional direct communication between the first and second terminal devices using the first and second unidirectional useful data connections.

* * * * *